United States Patent
Asahara et al.

(10) Patent No.: US 7,393,467 B2
(45) Date of Patent: Jul. 1, 2008

(54) WHOLLY AROMATIC LIQUID-CRYSTALLINE POLYESTER AND METHOD FOR PREPARING THE SAME

(75) Inventors: Motoki Asahara, Sanda (JP); Tetsuhide Sawada, Nishinomiya (JP); Hiroyuki Kato, Kawanishi (JP)

(73) Assignee: Kabushiki Kaisha Ueno Seiyaku Oyo Kenkyujo, Osaka-fu (JP)

( * ) Notice: Subject to any disclaimer, the term of this patent is extended or adjusted under 35 U.S.C. 154(b) by 202 days.

(21) Appl. No.: 11/341,625

(22) Filed: Jan. 30, 2006

(65) Prior Publication Data

US 2006/0186375 A1    Aug. 24, 2006

(30) Foreign Application Priority Data

Jan. 31, 2005    (JP)    ............... 2005-023415

(51) Int. Cl.
- *C09K 19/52* (2006.01)
- *C09K 19/32* (2006.01)
- *C09K 19/20* (2006.01)
- *C09K 19/38* (2006.01)
- *C08G 63/00* (2006.01)

(52) U.S. Cl. ............... 252/299.01; 252/299.62; 252/299.67; 528/190; 528/193; 528/194

(58) Field of Classification Search ............ 252/299.01, 252/299.62, 299.67; 528/190, 192, 193, 528/194; 264/176.1, 219
See application file for complete search history.

(56) References Cited

U.S. PATENT DOCUMENTS

| | | | |
|---|---|---|---|
| 4,429,061 A | | 1/1984 | Ide |
| 5,171,823 A | * | 12/1992 | Charbonneau et al. ...... 528/193 |
| 6,093,787 A | | 7/2000 | Long et al. |
| 6,177,500 B1 | | 1/2001 | Okamoto et al. |
| 6,656,386 B2 | * | 12/2003 | Suenaga et al. ........ 252/299.62 |
| 6,664,341 B2 | * | 12/2003 | Kitayama et al. ............ 525/437 |
| 6,774,203 B1 | | 8/2004 | Fukute |
| 6,984,712 B2 | * | 1/2006 | Ueno et al. .................. 528/206 |
| 7,179,401 B2 | * | 2/2007 | Ueno et al. ............ 252/299.01 |
| 7,304,121 B2 | * | 12/2007 | Kato et al. .................. 528/176 |
| 7,335,318 B2 | * | 2/2008 | Asahara et al. ......... 252/299.01 |
| 2002/0121626 A1 | | 9/2002 | Nagashima et al. |

FOREIGN PATENT DOCUMENTS

| | | |
|---|---|---|
| EP | 0324608 A2 | 7/1989 |
| EP | 0383177 A2 | 8/1990 |
| EP | 1081173 A2 | 3/2001 |
| EP | 1195408 A1 | 4/2002 |
| WO | WO 2004/007590 A1 | 1/2004 |

* cited by examiner

*Primary Examiner*—Shean C Wu
(74) *Attorney, Agent, or Firm*—Sughrue Mion, PLLC

(57) ABSTRACT

Provided is a liquid-crystalline polyester with good properties obtainable by subjecting a prepolymer consisting of the repeating units represented by formulae (I), (II), (III) and (IV):

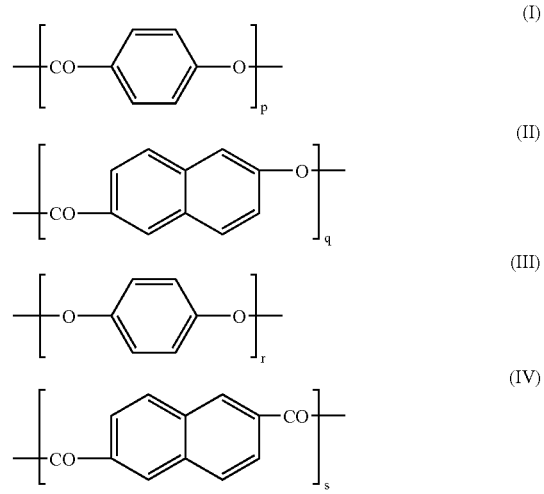

to heat treatment in a substantially solid state.

10 Claims, 1 Drawing Sheet

WHOLLY AROMATIC LIQUID-CRYSTALLINE POLYESTER AND METHOD FOR PREPARING THE SAME

BACKGROUND OF THE INVENTION

1. Field of the Invention

The present application relates to a wholly aromatic liquid crystalline polyester and a method for preparing the same. In particular, the present invention relates to liquid-crystalline polyester which exhibits high heat stability, excellent moldability and flowability as well as excellent mechanical properties.

2. Related Art

Thermotropic liquid-crystalline polyester (which is called as "liquid-crystalline polyester" or "LCP" hereinafter) has good properties including heat resistance, mechanical properties such as rigidity, chemical resistance and dimensional accuracy and is used not only for molded articles but also for a variety of products such as fibers and films. Particularly, personal computers and mobile phones employ highly integrated devices and the art wishes to use downsized, thinner and smaller parts for them. In the information and telecommunication fields, very thin parts, as thin as 0.5 mm or less of the thickness, are sometimes required. Based on the excellent molding properties of LCPs including good flowability and less flash development compared to the other thermoplastic resins, consumption of LCPs has been increasing.

Recently, LCPs are employed for a variety of uses wherein the resins are processed at a high-temperature such as solder-welding and infrared reflow-welding. However, the LCPs produced by polymerization method, such as slurry polymerization or molten acidlysis, do not exhibit sufficient heat resistance.

In order to obtain a LCP with an excellent heat resistance, methods using solid phase polymerization step have been proposed. For example, U.S. Pat. No. 6,582,625, Japanese Patent Application Laid Open No. 2000-248056 and Japanese Patent Application Laid Open No. Hei. 11-246654 (the cited references are herein incorporated by reference) disclose methods for producing LCPs, which comprise the steps of preparing powdery or pellet-formed prepolymer with a low polymerization degree and heating said prepolymer in solid phase to give polymers with high polymerization degree. In general, thus obtained LCPs have high melting point besides the high heat resistance and therefore, need to be processed with relatively high temperatures.

Japanese Patent Examined Publication No. H03-55489 proposed LCP obtained by copolymerizing 4-hydroxybenzoic acid, 2,6-naphthalene dicarboxylic acid and hydroquinone with a small amount of 6-hydroxy-2-naphthoic acid. According to the patent, thus obtained LCP will exhibit good mechanical and thermal properties and provide good moldability.

However, what the Japanese Patent Examined Publication No. H03-55489 disclosed is the LCP obtained by melt polymerization of the monomers and is silent about LCPs which is subjected to heat treatment in a substantially solid state.

SUMMARY OF THE INVENTION

An object of the present invention is to provide a wholly aromatic liquid-crystalline polyester which exhibits high heat resistance and can be processed at relatively low temperatures. Another object of the present invention is to provide a method for producing said liquid-crystalline polyester and providing liquid-crystalline polyester compositions comprising said LCP.

In a first aspect of the present invention, a liquid-crystalline polyester, which has a deflection temperature under load (DTUL) of 290-340° C.; the difference between the DTUL and the crystalline melting temperature of the liquid-crystalline polyester determined by differential scanning calorimetry is equal to or less than 40° C.; and which is obtainable by subjecting a prepolymer consisting of the repeating units of formulae (I), (II), (III) and (IV):

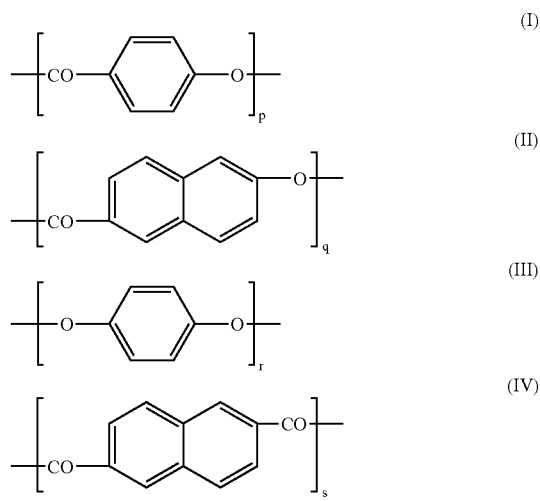

wherein, p, q, r and s represent relative molar proportions (mol %) of the repeating units in the prepolymer and satisfy the following formulae;

$60 \leq p+q \leq 78$ $0.05 \leq q \leq 3$ $11 \leq r \leq 20$ and $11 \leq s \leq 20$ to heat treatment in a substantially solid state.

In another aspect of the present invention, a liquid-crystalline polyester composition comprising the LCP as above is provided.

In a further aspect of the present invention, a method for preparing a liquid-crystalline polyester which comprises the steps of:

polycondensing monomers which provide the repeating units of formulae (I), (II), (III) and (IV) to give pellets of prepolymer consisting of the repeating units of formulae (I), (II), (III) and (IV):

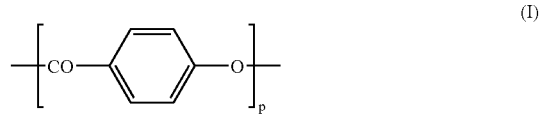

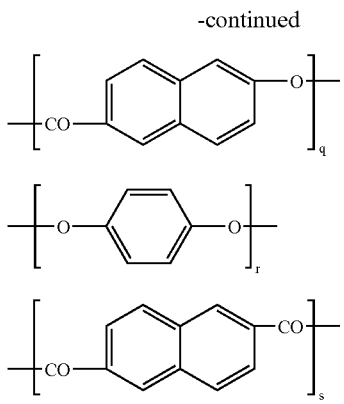

wherein, p, q, r and s represent relative molar proportions (mol %) of the repeating units in the prepolymer and satisfy the following formulae:

$60 \leq p+q \leq 78$ $0.05 \leq q \leq 3$ $11 \leq r \leq 20$ and $11 \leq s \leq 20$; and subjecting the pellets to heat treatment at 250-335° C. in a substantially solid state.

DETAILED DESCRIPTION OF THE PREFERRED EMBODIMENTS

Figure 1:
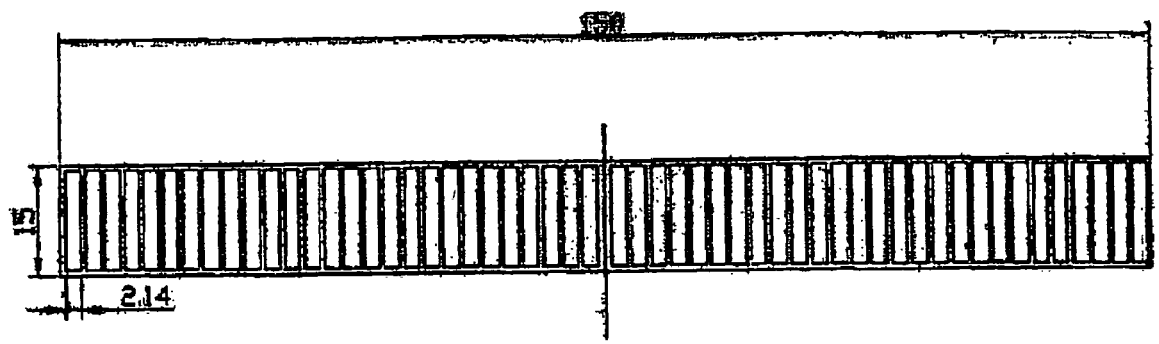
FIG. 1 is a schematic representation of harmonica-shaped die used for the assessment of molding flowability. The die has length of 150 mm, width of 15 mm and depth of 10 mm. It has 54 grids and a side gate of 5 mm×0.5 ml.

In the present specification and claims, the term "solid phase polymerizing" or "solid phase polymerization" represents the process of heating the prepolymer in a substantially solid state.

In the present specification and claims, the liquid-crystalline polyester or LCP is that exhibits anisotropic melt phase and is called as thermotropic liquid-crystalline polyester by those skilled in the art. The anisotropic melt phase can be confirmed by means of a conventional polarized light system using orthogonal light polarizer. In more detail, by observing the sample on the hot stage under nitrogen atmosphere.

The LCP of the present invention is composed of aromatic oxycarbonyl, aromatic dioxy and aromatic dicarbonyl repeating units.

The liquid-crystalline polyester of the present invention comprises 4-oxybenzoyl repeating unit of formula (I) and 6-oxy-2-naphthoyl repeating unit of formula (II) as aromatic oxycarbonyl repeating units:

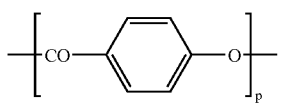

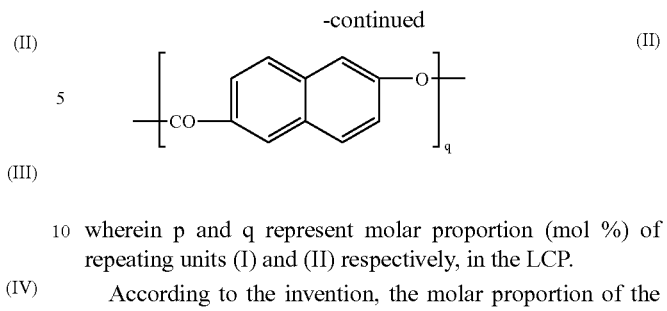

wherein p and q represent molar proportion (mol %) of repeating units (I) and (II) respectively, in the LCP.

According to the invention, the molar proportion of the total amount of repeating units (I) and (II) based on the total repeating units in the LCP is 60-78 mol %, preferably 65-75 mol %.

Among the above, the molar proportion of the repeating unit (II) based on total repeating units in the LCP is 0.05-3 mol %, preferably, 0.1-2 mol %.

According to the present invention, by adding such a small amount of the repeating unit (II) to the main aromatic oxycarbonyl repeating unit (I), the step for preparing prepolymer by means of molten acidolysis method, which is described below, will be facilitated.

When the proportion of the repeating unit (II) is less than 0.05 mol %, prepolymer in the reaction vessel tends to cake or solidify during the preparation process. When the amount of the repeating unit (II) is more than 3 mol %, the heat resistance of the resulting LCP might be decreased.

In addition, when the proportion of the total amount of the repeating units (I) and (II) is more than 78 mol %, the prepolymer in the reaction vessel also tends to cake or solidify upon preparing prepolymer.

Examples of monomers, which provide the repeating unit of formula (I) are 4-hydroxybenzoic acid and ester forming derivatives such as acyl derivative, ester derivatives and acyl halide thereof.

Examples of monomers which provide the repeating unit of formula (II) may include 6-hydroxy-2-naphthoic acid and ester forming derivatives such as acyl, ester and acyl halide derivatives thereof.

The liquid-crystalline polyester of the present invention further comprise the aromatic dioxy repeating unit of formula (III):

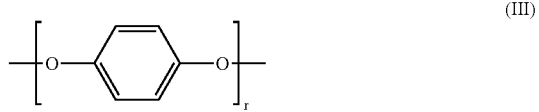

wherein r represents molar proportion (mol %) of the unit based on the total repeating units in the LCP.

The molar proportion of the aromatic dioxy repeating unit (III) based on total repeating units in the LCP is 11-20 mol %, preferably, 12.5-17.5 mol %.

Examples of monomers which provide the repeating unit of formula (III) include hydroquinone and its ester forming derivatives such as acylated hydroquinone.

The LCP of the present invention further comprises the aromatic dicarbonyl repeating unit of formula (IV):

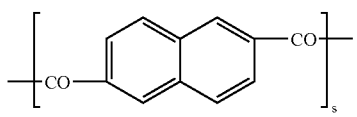

(IV)

wherein s represents molar proportion (mol %) of the unit based on the total repeating units in the LCP.

The molar proportion of the aromatic dicarbonyl repeating unit (IV) based on the total repeating units in the LCP is 11-20 mol %, preferably, 12.5-17.5 mol %.

Examples of monomers that provides repeating unit (IV) include 2,6-naphthalene-dicarboxylic acid, its ester and ester forming derivatives such as acid halide derivatives.

In a preferred embodiment, the total molar amount of the aromatic dicarbonyl repeating units (II) and (IV) and the molar amount of the aromatic dioxy repeating unit (III) are substantially equal.

According to the present invention, the LCP may be prepared by polycondensing monomers which provide repeating units of formulae (I)-(VI) to give prepolymer and subjecting the prepolymer to heat treatment. The heat treatment is preferably conducted by heating the prepolymer at 250-335° C.

In another aspect of the invention, the LCP may be prepared by polycondensing monomers which provide repeating units of formulae (I)-(IV) to give pellets of prepolymer and subjecting the pellets to heat treatment at 250-335° C. in a substantially solid state.

In the present invention, p, q, r and s, which represent the molar proportion of the repeating units (I)-(IV) respectively, meet the following formulae:

$$60 \leq p+q \leq 78$$

$$0.05 \leq q \leq 3$$

$$11 \leq r \leq 20$$

$$11 \leq s \leq 20.$$

According to the method of the present invention, the LCP is obtained by polycondensing the monomers which provide the repeating units (I)-(IV) to give prepolymer, and subjecting the prepolymer to heat treatment at 250-335° C. in a substantially solid state. The polycondensing step may be carried out by any of conventional methods for preparing polyester such as molten acidolysis and slurry polymerization.

The molten acidolysis method is preferably used for preparing the prepolymer of the present invention. In this method, the monomers are heated to give molten solution and then the solution is reacted to give the molten polymer. The final step of this method may be carried out under vacuum to facilitate removal of the volatile by-products such as acetic acid or water.

In the slurry polymerization method, monomers are reacted under the presence of heat-exchange fluid to give solid state polyester resin in the form of suspension in the heat-exchange liquid medium.

In either of the molten acidolysis or the slurry polymerization method, the polymerizing monomers may be provided in modified form, i.e. as lower acyl ester, which can be obtained by esterifying the hydroxyl group. The lower acyl group may preferably have 2-5, more preferably 2 or 3 carbon atoms. Acetyl esters of the above described monomers are most preferably used for the reaction.

The lower acyl esters of the monomers may be those prepared beforehand by acylating the monomers independently or may be those produced in the reaction system by adding an acylating agent such as acetic anhydride to the monomers upon preparing the prepolymer.

In either of the molten acidolysis method or the slurry polymerization method, a catalyst may be used in the reaction, if desired.

Examples of the catalysts include organic tin compounds such as dialkyl tin oxide (ex. dibutyl tin oxide) and diaryl tin oxide; organic titanium compounds such as titanium dioxide, antimony trioxide, alkoxy titanium silicate and titanium alkoxide; alkaline or alkaline earth metal salt of carboxylic acid such as potassium acetate; and gaseous acid catalysts such as Lewis acid (ex. $BF_3$) and halogenated hydrogen (ex. HCl).

In the present invention, the term "prepolymer" refers to polymer with low polymerization degree obtained by the above described polycondensation reaction and that is going to be subjected to the solid phase polymerization or the heat treatment.

The highest reaction temperature in the polymerization of prepolymers is hereinafter referred as Tmax.

The prepolymer may has crystalline melting temperature (Tm) of from Tmax−40° C. to Tmax+10° C., preferably, from Tmax−30° C. to Tmax+5° C. for good operability upon pulling out the prepolymer from the polymerizing container, shortened solid phase polymerizing period, and good heat resistance of resulting LCP.

Further, the Tmax of the prepolymer is preferably 310-360° C., especially 320-355° C. for the shortened solid phase polymerizing period and good thermal stability of the prepolymer.

In the present specification and claims, Tm is the value measured by the following method.

<Method for Determining the Crystalline Melting Temperature>

The differential scanning calorimeter (DSC) Exstar 6000 (Seiko Instruments Inc., Chiba, Japan) or the same type of DSC device is used. The prepolymer or LCP sample to be examined is heated from room temperature at a rate of 20° C./minute and the endothermic peak (Tm1) is recorded. Thereafter, the sample is kept at a temperature 20-50° C. higher than Tm1 for 10 minutes. The sample is then cooled to room temperature at the rate of 20° C./minute and is heated again at the rate of 20° C./minute. Endothermic peak found in the final step is recorded as crystalline melting temperature (Tm) of the sample prepolymer or LCP.

According to the present invention, the melt viscosity of the prepolymer which is determined at a temperature 20° C. higher than Tm is preferably 5-40 Pa·s. In the specification and claims, the melt viscosity is determined by the following method.

<Method for Determining Melt Viscosity>

Melt viscosity of the sample is measured with a melt viscosity measuring device (capillograph 1A, Toyo Seiki Seisaku-sho Ltd, Tokyo, Japan) having capillary of 0.7 mm φ×10 mm. The measurement is carried out at a temperature of Tm+20° C. for the prepolymer or Tm+30° C. for the LCP obtained by subjecting the prepolymer to the heat treatment, and at a shear rate of 1000 $sec^{-1}$.

The prepolymer in molten state is pulled out of the polycondensation reaction vessel and is processed to give pellet, flake or powder form. Thereafter, the prepolymer is subjected to the solid phase polymerization or heat treatment. The form of prepolymer is preferably pellet because of its good operability upon the solid phase polymerization. The structure of pellet is not limited and preferably is columnar structure. Columnar pellets can exhibit good flowability and dispersibility in the solid phase polymerization reaction vessel. By using such columnar pellet, unevenness of color and mechanical property can be reduced.

The shape of the cross section of the columnar structured pellet is not limited and preferably, is circular, elliptic or square, and more preferably circular or elliptic. In the present invention, the term "elliptic shape" represents not only geometrical elliptic shape but also oval shape which has about linear portion in its circumference and appears as almost elliptic.

Preferably, the circular or elliptic cross section of the columnar pellet has a cross section diameter (when cross section is elliptic, major axis of cross section; and when cross section is infinite form, diameter of its circumcircle) of 2.5-4.0 mm and a pellet length of 2.5-5.0 mm.

The procedure of the solid phase polymerization of the pellet, flake or powder formed prepolymer is not limited. The solid phase polymerization may be carried out by heating the prepolymer at 250-335° C. using an equipment such as multistage oven, rotary oven, hopper-typed reaction vessel, vertical reaction vessel and agitator vertical reaction vessel.

The solid phase polymerization is preferably carried out under an inert gas such as nitrogen, helium and argon gas atmosphere or under reduced pressure. Under such conditions, the resultant LCP will take on good color tone. The degree of vacuum upon solid phase polymerization may be dependent on the apparatus employed. A high degree of vacuum is preferable so that the time period required for the solid phase polymerization becomes shorter.

The time period for the solid phase polymerization is not specially limited and in general, it may be 3-20 hours.

The LCP of the present invention obtained after the solid phase polymerization will has deflection temperature under load (DTUL) determined according to ASTM D 648 of 290-340° C., preferably 290-330° C. That is, the LCP of the present invention is excellent in heat resistance.

The LCP of the invention has DTUL of 290-340° C. and the difference between the Tm of the LCP and the DTUL (Tm−DTUL) is less than 40° C. More preferably, the LCP has a crystalline melting temperature (Tm) of 320-345° C. Upon determining the difference between Tm and DTUL, the DTUL is the value determined with the LCP comprising no filler and/or reinforcements.

In the present specification and claims, the deflection temperature under load (DTUL) is the value determined by the following method.

<Method for Determining Deflection Temperature Under Load>

Test strip with length of 127 mm, width of 3.2 mm, and thickness of 12.7 mm is molded using injection molding machine (UH 1000-110, Nissei Plastic Industrial Co., Ltd.). Deflection temperature is measured using the test strip according to ASTM D 648 under load of 1.82 MPa and heating rate of 2° C./min.

Moreover, the LCP of the present invention preferably has a melt viscosity determined by capillary rheometer of 10-80 Pa·s, and especially 20-60 Pa·s. That is, the LCP of the present invention will exhibit an excellent heat resistance and good moldability at the same time. The melt viscosity is measured by the above described method.

According to the present invention, a LCP composition which comprises the LCP of the present invention and one or more fibrous, lamellar or particulate filler and/or reinforcement is also provided.

Examples of the fibrous fillers and/or reinforcements may include glass fiber, silica-alumina fiber, alumina fiber, carbon fiber and aramid fiber. Among them, glass fiber is preferable because of its good balance of physical properties and cost.

Examples of the lamellar or particulate fillers and/or reinforcements may include talc, mica, graphite, wollastonite, calcium carbonate, dolomite, clay, glass flake, glass beads, barium sulfate and titanium oxide.

The fillers and/or reinforcements may be added to the LCP composition of the present invention in an amount of 0.1-200 parts by weight, preferably 10-100 parts by weight per 100 parts by weight of the LCP. If the amount of the fillers and/or reinforcements is more than 200 parts by weight, the moldability of the resulting composition tends to be decreased or the exhausting of the cylinder or die of the molding device tends to be increased.

The LCP composition of the present invention which comprises the filler and/or reinforcement exhibits high heat stability and has DTUL determined by ASTM D 648 of 290-340° C., preferably 290-330° C.

The LCP composition according to the present invention may further be admixed with one or more additives, which are conventionally admixed in resin compositions, if desired. For example, molding lubricant such as higher aliphatic acid, higher aliphatic ester, higher aliphatic amide, higher aliphatic acid metal salt (the term "higher aliphatic" used herein refers to those having C10-C25 aliphatic moiety), polysiloxane and fluorocarbon resin; colorant such as dyes and pigments; antioxidant; thermal stabilizer; UV absorbent; antistatic agent; and surface active agent may be admixed.

The amount of the additives added to the LCP composition of the present invention is not limited and may be in an amount of 0.05-1 part by weight, preferably 0.1-0.5 part by weight per 100 parts by weight of the LCP/LCP composition.

Molding lubricants such as higher aliphatic acid, higher aliphatic ester, higher aliphatic acid metal salt or fluorocarbon-type surfactant may be added to the pellets of the LCP or the LCP composition before subjecting the pellets to the molding process, so that the agent adhere to the outer surface of the pellet.

The LCP composition of the present invention may comprise one or more additional resin components unless the additional component does not impair the object of the present invention. Examples of the additional resin components include thermoplastic resins such as polyamide, polyester, polyphenylene sulfide, polyether ketone, polycarbonate, polyphenylene ether and denatured derivatives thereof, polysulfone, polyethersulfone and polyether imide and thermosetting resins such as phenol resin, epoxy resin and polyimide resin. The amount of the additional resin component is not limited, and may be determined dependent on the intended property. Typically, such additional resins may be added to the LCP composition in an amount of 1-200 parts by weight, preferably 10-100 parts by weight per 100 parts by weight of the LCP.

The LCP composition of the present invention may be obtained by adding fillers, reinforcements, additives and the other resin components to the LCP and melt kneading the mixture using a kneading machine such as Banbury mixer, kneader, single screw extruder, twin screw extruder or the like at a temperature of from near Tm to Tm+30° C.

The LCP or LCP composition of the present invention may be molded using a conventional method such as injection molding, compression molding, extrusion molding and blow molding. The LCP composition of the present invention exhibit excellent heat resistance and sufficient moldability. Therefore, the molded articles obtained with the LCP/LCP composition are particular useful for parts of electric and electronic devices, machines and automobiles.

EXAMPLES

The present invention is further described in reference to the following Examples. In the examples, DTUL, flexural strength, and molding flowability are assessed by the following procedures.

(1) Deflection Temperature Under Load (DTUL)

Test strip with length of 127 mm, width of 3.2 mm, and thickness of 12.7 mm was molded using injection molding machine (UH 1000-110, Nissei Plastic Industrial Co., Ltd.). Deflection temperature was measured using the test strip according to ASTM D 648 under load of 1.82 MPa and heating rate of 2° C./min.

(2) Flexural Strength

The same test strip used for determining DTUL was used. Flexural strength was measured according to ASTM D 790.

(3) Molding Flowability

Harmonica-shaped die illustrated in FIG. 1 and a injection molding machine (UH1000-110, Nissei Plastic Industrial Co., Ltd.) were used. The sample LCP or LCP composition was injected into the die at a predetermined cylinder temperature, at die temperature of 70° C., under injection pressure of 157 MPa and injection rate of 200 mm/s. Molding Flowability was assessed as filling ratio of LCP/LCP composition to the die, i.e. the weight ratio of the filled LCP/LCP composition to the amount of the LCP/LCP composition for completely fill the die.

In the examples and comparative examples below, following abbreviations are used.
POB: 4-hydroxybenzoic acid
BON6: 6-hydroxy-2-naphthoic acid
HQ: hydroquinone
NDA: 2,6-naphthalene dicarboxylic acid
BP: 4,4'-dihydroxybiphenyl
TPA: terephthalic acid Example 1

<Production of Polymer with Low Polymerization Degree>

POB 238.8 kg (1728 moles), BON6 4.5 kg (24 moles), HQ 35.7 kg (324 moles), NDA 70.0 kg (324 moles) and acetic anhydride 254.3 kg (2491 moles) were fed in the 0.5 m$^3$ polymerization container made of SUS equipped with an agitating device and a heat exchanger. Under nitrogen gas atmosphere, the mixture was heated from the room temperature to 145° C. over 1 hour and kept at the temperature for 0.5 hour. Then the mixture was heated to 348° C. over 8 hours with distilling out the by-product, acetic acid and polymerized at the temperature for 30 minutes, then the pressure of the reaction container was reduced from the atmospheric pressure to 20 torr over 70 minutes. The reaction was further conducted at the pressure. Thirty minutes after, the torque of the reaction became the predetermined level and the polymerization container was sealed. The reaction was terminated by inducing nitrogen gas to the container so that the pressure in the container was increased to 0.1 MPa.

Then, nitrogen gas was induced to the container and the pressure in the container was increased to 0.2 MPa. The valve at the bottom of polymerization container was opened and the content of the container was pulled out through the dice of 3.0 mm φ×7 mm to give strands of the prepolymer. The strands were transferred to the cutter through the water-cooled carrier machine equipped just under the polymerization container and were cut to give pellets of polymer with low polymerization degree or prepolymer.

The resultant pellets were columnar of about 3.0 mm long with circular cross of 3.2 mm diameter. The crystalline melting temperature of the prepolymer determined by differential scanning calorimetry was 332° C. and the melt viscosity was 17 Pa·s.

<Solid Phase Polymerization>

10 kg of the pellets of thus obtained polymer with low polymerization degree (i.e., the prepolymer) were rapidly fed in the vessel of 40 L-tumble dryer made by SUS. The gas phase in the vessel was kept at 290° C. After the gas phase was exchanged by nitrogen gas, the vessel was rotated under nitrogen gas flow of 120 L/hour to effect the solid phase polymerization.

Five hours after the pellets were fed, the dryer was stopped and the temperature of the gas phase in the vessel was decreased to 200° C. over 1 hour. Then, flange of the dryer was opened and the pellets of the LCP were ejected. At that time, adhesion among the pellets was not observed and pellets were easily pulled out of the dryer. The resulting LCP obtained by the solid phase polymerization exhibited anisotropy in molten state as observed by polarization microscope equipped with hot-stage.

The DTUL of thus obtained LCP was 296° C., the crystalline melting temperature was 333° C. and the melt viscosity was 16 Pa·s.

<Preparation of LCP Composition>

To 70 parts by weight of the obtained LCP, 30 parts by weight of glass fiber (chopped strand 03-T-747-GH, Nippon Electric Glass Co. Ltd., Shiga, Japan) was admixed. The mixture was subjected to pelletization using twin screw extruder (TEX30 α-35BW-2V, The Japan Steel Works, LTD., Tokyo, Japan) with cylinder temperature of 370° C. and screw rotation speed of 306 rpm to give LCP composition. The DTUL of the LCP composition was 302° C. and the flexural strength was 189 MPa. The flowability upon molding was examined at a cylinder temperature of 370° C. The resin filling ratio to the harmonica-shaped die was 82%.

Example 2

<Preparation of Polymer with Low Polymerization Degree>

POB 234.8 kg (1699 moles), BON6 0.9 kg (5 moles), HQ 38.3 kg (348 moles), NDA 75.2 kg (348 moles) and acetic anhydride 254.3 kg (2491 moles) were fed in polymerization container and polymer with low polymerization degree was prepared by the same procedure as EXAMPLE 1 with the exception that a dice of 3.5 mm φ×7 mm was used.

The resultant pellet was columnar of 3.7 mm long with circular cross section of 3.5 mm diameter. The crystalline melting temperature of the obtained polymer with low polymerization degree determined by differential scanning calorimetry was 331° C. and the melt viscosity was 16 Pa·s.

<Solid Phase Polymerization>

10 kg of thus obtained pellet (i.e., prepolymer) was subjected to solid phase polymerization by the same procedure as EXAMPLE 1 at 310° C. for 5 hours to give pellets of solid phase polymerized LCP. Adhesion among pellets was not observed and pellets were easily pulled out of the solid phase polymerization equipment.

The DTUL of this LCP was 311° C., the crystalline melting temperature was 333° C. and the melt viscosity was 38 Pa·s.

<Preparation of LCP Composition>

To the obtained LCP, glass fiber was admixed and LCP composition was prepared by the same procedures as EXAMPLE 1. The DTUL of the LCP composition was 313° C., the flexural strength was 208 MPa. The flowability upon molding was examined at a cylinder temperature of 370° C. The resin filling ratio to the harmonica-shaped die was 66%.

Example 3

<Preparation of Polymer with Low Polymerization Degree>

POB 232.2 kg (1680 moles), BON6 9.0 kg (48 moles), HQ 37.0 kg (336 moles), NDA 72.6 kg (336 moles) and acetic anhydride 254.3 kg (2491 moles) were fed in the 0.5 m³ polymerization container made of SUS equipped with an agitating device and a heat exchanger. Under nitrogen gas atmosphere, the mixture was heated from the room temperature to 145° C. over 1 hour and kept at the temperature for 0.5 hour. The mixture was then heated to 328° C. over 6 hours with distilling out the by-product, acetic acid and kept at the temperature for 30 minutes. After that, at the same temperature, the pressure of the container was reduced from the atmospheric pressure to 50 torr over 60 minutes. At that time, the torque of the reaction became the predetermined level and the polymerization container was sealed. The reaction was terminated by inducing nitrogen gas so that the pressure in the container was increased to 0.1 MPa. The prepolymer was pulled out from the container through the dice of 3.5 mm φ×7 mm in the same manner as EXAMPLE 1.

The resultant pellets were columnar of about 3.3 mm long with circular cross of about 3.2 mm diameter. The crystalline melting temperature of the obtained polymer with low polymerization degree determined by differential scanning calorimetry was 323° C. and the melt viscosity was 10 Pa·s.

<Solid Phase Polymerization>

10 kg of thus obtained pellets (i.e., prepolymer) were subjected to solid phase polymerization by the same procedure as EXAMPLE 1 at 285° C. for 9 hours to give pellets of solid phase polymerized LCP. Adhesion among pellets was not observed and pellets were easily pulled out of the solid phase polymerization equipment.

The DTUL of this LCP was 290° C., the crystalline melting temperature was 325° C. and the melt viscosity was 20 Pa·s.

<Preparation of LCP Composition>

To the obtained LCP, glass fiber was admixed and LCP composition was prepared by the same procedures as EXAMPLE 1. DTUL of the LCP composition was 298° C., the flexural strength was 210 MPa. In addition, the flowability upon molding was examined at a cylinder temperature of 370° C. The resin filling ratio to harmonica-shaped die was 98%.

Comparative Example 1

<Preparation of Polymer with Low Polymerization Degree>

POB 677.2 g (4.9 moles), HQ 88.1 g (0.8 moles), NDA 173.0 g (0.8 moles) and acetic anhydride 694.3 g (6.8 moles) were fed in the 2 L polymerization container made of glass equipped with an agitating device and a heat exchanger. Under nitrogen gas atmosphere, the mixture was heated from the room temperature to 145° C. over 1 hour and kept at the temperature for 0.5 hour. Then the mixture was heated to 305° C. over 4.5 hours with distilling out the by-product, acetic acid. At that time, the reaction mixture was solidified and could not be further agitated, and therefore, the reaction was terminated. No polymer with low polymerization degree was obtained.

Comparative Example 2

<Preparation of Polymer with Low Polymerization Degree>

POB 179.1 kg (1296 moles), BON6 9.0 kg (48 moles), HQ 58.1 kg (528 moles), NDA 114.2 kg (528 moles) and acetic anhydride 254.4 kg (2492 moles) were fed in the 0.5 m³ polymerization container made of SUS and polymer with low polymerization degree was prepared by the same procedure as EXAMPLE 3.

The resultant pellets were columnar of about 3.5 mm long with circular cross of 3.6 mm diameter. The crystalline melting temperature of the obtained polymer with low polymerization degree determined by differential scanning calorimetry was 315° C. and the melt viscosity was 14 Pa·s.

<Solid Phase Polymerization>

10 kg of thus obtained pellets (i.e., prepolymer) were subjected to solid phase polymerization by the same procedure as EXAMPLE 1 at 280° C. for 9 hours to give pellets of solid phase polymerized LCP. Adhesion among pellets was not observed and pellets were easily pulled out of the solid phase polymerization equipment.

DTUL of this LCP was 270° C., crystalline melting temperature was 316° C. and melt viscosity was 19 Pa·s.

<Preparation of LCP Composition>

To the obtained LCF, glass fiber was admixed and LCP composition was prepared by the same procedures as EXAMPLE 1. The DTUL of the LCP composition was 287° C. and the flexural strength was 204 MPa. The flowability upon molding was examined at a cylinder temperature of 370° C. The resin filling ratio to the harmonica-shaped die was 100%.

Comparative Example 3

<Production of Polymer with Low Polymerization Degree>

POB 691.0 g (5.0 moles), BON6 37.6 g (0.2 moles), HQ 71.6 g (0.65 moles), NDA 140.5 g (0.65 moles) and acetic anhydride 694.3 g (6.8 moles) were fed in the 2 L polymerization container made of glass equipped with an agitating device and a heat exchanger. Under nitrogen gas atmosphere, the mixture was heated from the room temperature to 145° C. over 1 hour and kept at the temperature for 0.5 hour. Then the mixture was heated to 305° C. over 4.5 hours with distilling out the by-product, acetic acid. At the time, the reaction mixture became solidified and therefore, the mixture could not further stirred. No polymer with low polymerization degree was obtained.

Comparative Example 4

<Preparation of Polymer with Low Polymerization Degree>

POB 232.2 kg (1680 moles), BP 67.0 kg (360 moles), TPA 59.8 kg (360 moles), NDA 10.4 kg (48 moles) and acetic anhydride 255.0 kg (2498 moles) were fed in the 0.5 m³ polymerization container made of SUS equipped with an agitating device and a heat exchanger. Under nitrogen gas atmosphere, the mixture was heated from the room temperature to 145° C. over 1 hour and kept at the temperature for 1 hour. Then the mixture was heated to 348° C. over 7 hours with distilling out the by-product, acetic acid. The polymerization reaction was carried out at that temperature for 50 minutes. At the time, the torque of the reaction became the predetermined level and the polymerization container was sealed.

Then, nitrogen gas was induced to the container and the pressure in the polymerization container was increased to 0.2 MPa. The valve at the bottom of the polymerization container was opened and the content of the polymerization container was pulled out through the dice of 3.5 mm φ×7 mm to give as strand. The strands were transferred to the cutter through the water-cooled carrier machine equipped just under the polymerization container. The strand was cut into pellets by the cutter to give the pellets of polymer with low polymerization degree (i.e. the prepolymer).

The resultant pellets were columnar of about 4 mm long with circular cross of 3.4 mm diameter. The crystalline melting temperature of the obtained polymer with low polymerization degree determined by differential scanning calorimetry was 349° C. and melt the viscosity was equal to or less than 10 Pas.

<Solid Phase Polymerization>

10 kg of the pellets of thus obtained polymer with low polymerization degree (i.e., the prepolymer) were subjected to the solid phase polymerization in the same manner as EXAMPLE 1 at 320° C. for 7 hours to give pellets of solid phase polymerized LCP. At that time, adhesion among the pellets was not observed and pellets were easily pulled out of the dryer.

The resulting pellets obtained by the solid phase polymerization exhibited anisotropy in molten state as observed by polarization microscope equipped with hot-stage. DTUL of the resin was 330° C., crystalline melting temperature was 374° C. and melt viscosity was 42 Pa·s.

<Preparation of LCP Composition>

To the obtained LCP, glass fiber was admixed and LCP composition was prepared by the same procedures as EXAMPLE 1. The DTUL of the LCP composition was 320° C. and the flexural strength was 190 MPa. The flowability upon molding was examined at a cylinder temperature of 370° C. However, the resin was solidified at the nozzle of the cylinder and could not be molded.

The properties of the polymer with low polymerization degree (prepolymer), the LCP obtained by subjecting the prepolymer to the solid phase polymerization as well as LCP composition are summarized in table 1.

TABLE 1

| | | EXAMPLES | | | COMPARATIVE EXAMPLES | | | |
|---|---|---|---|---|---|---|---|---|
| | | 1 | 2 | 3 | 1 | 2 | 3 | 4 |
| monomers | POB (mol %) | 72 | 70.8 | 70 | 75.4 | 54 | 76.9 | 68.6 |
| | BON6 (mol %) | 1 | 0.2 | 2 | — | 2 | 3.1 | — |
| | HQ (mol %) | 13.5 | 14.5 | 14 | 12.3 | 22 | 10 | — |
| | NDA (mol %) | 13.5 | 14.5 | 14 | 12.3 | 22 | 10 | 2 |
| | BP (mol %) | — | — | — | — | — | — | 14.7 |
| | TPA (mol %) | — | — | — | — | — | — | 14.7 |
| prepolymers | Tmax | 348° C. | 348° C. | 328° C. | *1 | 328° C. | *1 | 348° C. |
| | Tm | 322° C. | 331° C. | 323° C. | | 315° C. | | 349° C. |
| | Melt viscosity (Pa·s) | 17 | 16 | 10 | | 14 | | <10 |
| solid phase polymerization condition | polymerization temperature | 290° C. | 310° C. | 285° C. | — | 280° C. | — | 320° C. |
| | polymerization time | 5 Hr | 5 Hr | 9 Hr | — | 9 Hr | — | 7 Hr |
| LCPs obtained after the solid phase polymerization | Tm | 333° C. | 333° C. | 325° C. | — | 316° C. | — | 374° C. |
| | DTUL | 296° C. | 311° C. | 290° C. | — | 270° C. | — | 330° C. |
| | Tm – DTUL | 37° C. | 22° C. | 35° C. | | 46° C. | | 44° C. |
| | Melt viscosity (Pa·s) | 16 | 38 | 20 | — | 19 | — | 42 |
| LCP composition | DTUL | 302° C. | 313° C. | 298° C. | — | 287° C. | — | 320° C. |
| | Flexural strength (MPa) | 189 | 208 | 210 | — | 204 | — | 190 |
| | Molding Flowability cylinder temp. | 370° C. | 370° C. | 370° C. | — | 370° C. | — | 370° C. |
| | filled ratio | 82 | 66 | 98 | — | 100 | — | ND*2 |

*1 Polymer with low polymerization degree could not be obtained.
*2 Could not be molded As apparent from the table above, LCPs and LCP compositions of EXAMPLES 1-3 exhibited excellent properties. In contrast, COMPARATIVE EXAMPLES 1 and 3 show that a resin prepared from a monomer combination which does not comprise enough amount of BON6 or that from a monomer combination wherein the proportion of the total amount of POB and BON6 is more than 78 mol % tends to solidify easily and preparation of polymers with low polymerization degree or prepolymer was difficult. Further, COMPARATIVE EXAMPLE 2 shows that LCP prepared from a monomer combination wherein the proportion of the total amount of POB and BON6 to the total monomers is less than 60 mol % will exhibit only low DTUL and cannot provide enough heat resistance. Furthermore, although the LCP obtained by COMPARATIVE EXAMPLE 4 exhibited high heat resistance, the crystalline melting temperature was also high and the resulting LCP could not be molded at the cylinder temperature of 370° C.

What is claimed is:

1. A liquid-crystalline polyester, which has a deflection temperature under load (DTUL) of 290-340° C.; the difference between the DTUL and the crystalline melting temperature of the liquid-crystalline polyester determined by differential scanning calorimetry is equal to or less than 40° C.; and which is obtained by subjecting a prepolymer consisting of the repeating units of formulae (I), (II), (III) and (IV):

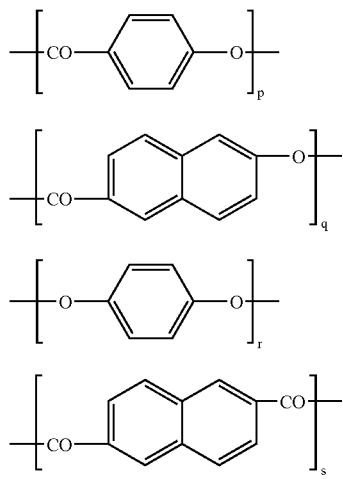

wherein, p, q, r and s represent relative molar proportions (mol %) of the repeating units in the prepolymer and satisfy the following formulae:

60≦p+q≦78

0.05≦q≦3

11≦r≦20 and

11≦s≦20 to heat treatment in a solid state.

2. The liquid-crystalline polyester according to claim 1, wherein the crystalline melting temperature which is determined by differential scanning calorimetry is 320-345° C.

3. The liquid-crystalline polyester according to claim 1, wherein the melt viscosity of the prepolymer determined at a temperature 20° C. higher than the crystalline melting temperature determined by differential scanning calorimetry is 5-40 Pa.s.

4. A liquid-crystalline polyester composition comprising 100 parts by weight of the liquid-crystalline polyester according to claim 1 and 0.1-200 parts by weight of a fibrous, lamellar or particulate filler and/or reinforcement.

5. The liquid-crystalline polyester composition according to claim 4, wherein the filler and/or reinforcement is glass fiber.

6. The liquid-crystalline polyester composition according to claim 4, wherein the deflection temperature under load of the composition is 290-340° C.

7. A molded article obtained by molding the liquid-crystalline polyester according to claim 1.

8. A molded article, which is obtained by molding the liquid-crystalline polyester composition according to claim 4.

9. A method for preparing liquid-crystalline polyester which comprises the steps of:

polycondensing in a reaction vessel monomers which provide the repeating units of formulae (I), (II), (III) and (IV) respectively to give prepolymer consisting of the repeating units of formulae (I), (II), (III) and (IV):

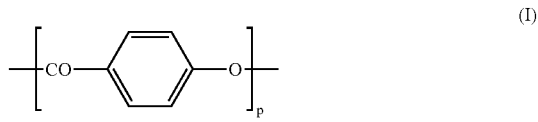

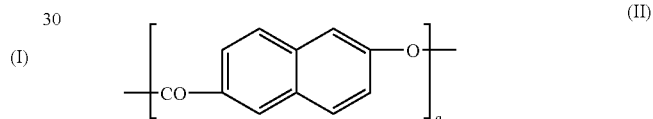

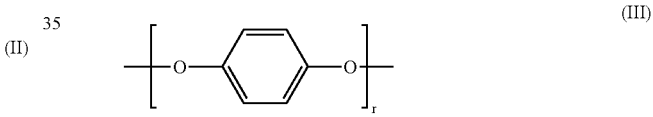

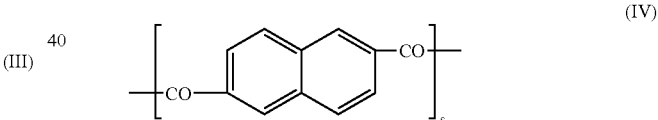

wherein, p, q, r and s represent relative molar proportions (mol %) of the repeating units in the resin and satisfy the following formulae:

60≦p+q≦78

0.05≦q≦3

11≦r≦20 and

11≦s≦20;

pulling out the prepolymer in a molten state from the reaction vessel to give strands of prepolymer, cutting the strands of prepolymer to give pellets of prepolymer; and subjecting the pellets of prepolymer to heat treatment at 250-335° C. in a solid state.

10. The method according to claim 9, wherein said pellets are columnar with circular or elliptic cross section having cross section diameter (when cross section is elliptic, major axis of cross section) of 2.5-4.0 mm and pellet length of 2.5-5.0 mm.

* * * * *